Patented July 3, 1923.

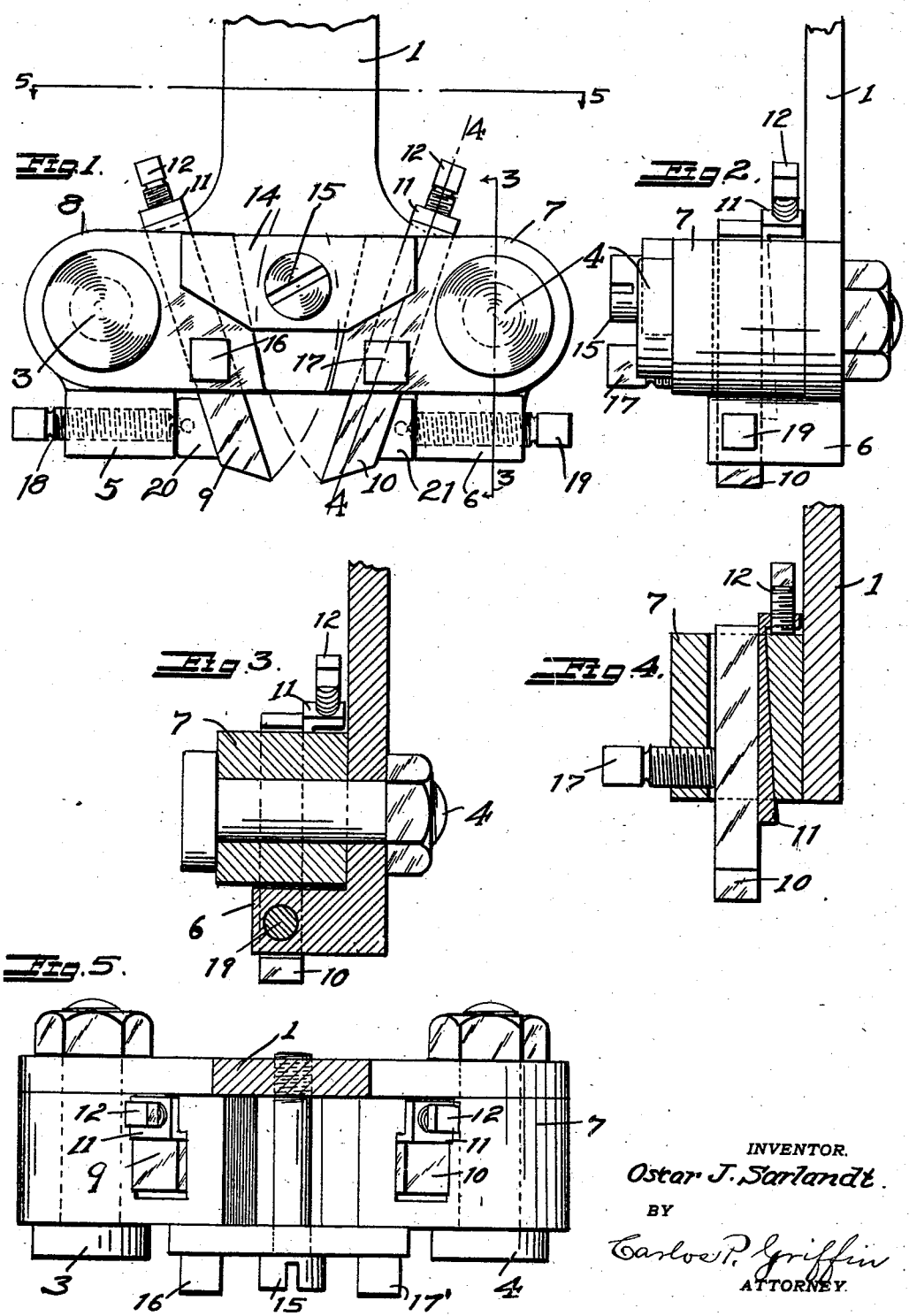
July 3, 1923.
O. J. SARLANDT
PLANER TOOL HOLDER
Filed Jan. 24, 1921
1,460,681
INVENTOR.
Oscar J. Sarlandt.
BY
Carlos P. Griffin
ATTORNEY.

1,460,681

UNITED STATES PATENT OFFICE.

OSCAR J. SARLANDT, OF SAN FRANCISCO, CALIFORNIA.

PLANER-TOOL HOLDER.

Application filed January 24, 1921. Serial No. 439,383.

*To all whom it may concern:*

Be it known that I, OSCAR J. SARLANDT, a citizen of the United States, residing at San Francisco, in the county of San Francisco, State of California, have invented a new and useful Planer-Tool Holder, of which the following is a specification in such full and clear terms as will enable those skilled in the art to construct and use the same.

This invention relates to a tool holder for planers and shapers. Its object is to produce a tool holder which will be capable of holding two cutters in opposite positions so that cuts may be made both on the forward and return strokes of the planer bed.

Another object of the invention is to provide a cutting tool which is capable of being disassembled with the minimum of labor and which will be provided with means whereby the cutting tools may be very nicely adjusted to produce precisely matched cuts.

Another object of the invention is to produce a tool holder which will have the cutters secured thereto in such a manner that when the tool is moved on the non-cutting stroke that it will tend to move directly away from the work and thereby prevent injury to the tool and also undue friction.

Another object of the invention is to provide means whereby the tool carriers will be prevented from moving laterally when pressure is applied to them.

Another object of the invention is to provide supports for the tools which will be capable of moving the tool directly away from the work on the non-cutting stroke and which will bring the tool down to the work on the cutting stroke by their own weight, no springs required.

Other objects of the invention will appear as the description proceeds.

An embodiment of the invention is shown in the drawings in which the same reference numeral is applied to the same portion throughout, but I am aware there may be modifications thereof.

Figure 1 is a side elevation of the tool holder.

Figure 2 is an edge elevation of the tool holder.

Figure 3 is a sectional view on the line 3—3' of Fig. 1.

Figure 4 is a sectional view on the line 4—4' of Fig. 1.

Figure 5 is a plan view of the complete tool holder.

In the drawings:

The numeral 1 represents the tool shank which is widened at its lower end in an inverted T shape to provide supports to receive two pivot pins 3 and 4. It also has two laterally extending lugs 5 and 6 upon which the tool carriers rest when moving on the cutting strokes. The tool carriers are indicated at 7 and 8 and they are held in place against the side of the supporting shank by means of the pivot pins 3 and 4.

The tool carriers have holes to receive the two cutters 9 and 10. Behind each cutter there is a wedge 11 with an adjustable screw 12 whereby the position of the cutters may be regulated laterally in order that the proper cut may be made.

A plate 14 is held in place against the sides of the tool carriers 7 and 8 by means of a screw 15, said plate permitting the tool carriers to move axially but preventing them from twisting laterally on their axes, thereby reducing the strain on the two pins 3 and 4.

Screws 16 and 17 are used to hold the cutters 9 and 10 in their proper position. Extending through the lugs 5 and 6 are the screws 18 and 19, said screws carrying blocks 20 and 21 which bear against the back sides of the cutters. Normally the tool carriers will rest upon the lugs 5 and 6 but owing to the fact that it is quite difficult to set the cutters 9 and 10 to make a cut of precisely the same depth each, the adjusting screws 18 and 19 are manipulated to regulate the depth of one cutter or the other in order to make both cuts the same.

In operation the shank 1 is secured to an immovable part of the planer and the bed of the planer carrying the work moves under the cutters. During one movement one cutter will be cutting the work, while the other cutter will rise high enough from the work to permit same to pass under it. Owing to the position of the center of the pivot pins the cutters move substantially vertically away from the work when not engaged in cutting.

It will of course, be understood that the space between the head of the screws 16 and 17 and plate 14 is ample to allow all the movements required.

What I claim is as follows, but various modifications may be made in the construction shown in the drawings and above particularly described form, within the purview of my invention.

1. A tool holder for planers and shapers comprising a shank, a pair of tool holders pivotally mounted thereon, oppositely projecting lugs for supporting said tool holders, tools carried by each tool holder between the pivots of the two tool holders, and means to prevent each tool holder from twisting laterally.

2. A tool holder for planers and shapers comprising a shank, a pair of tool holders pivotally mounted thereon with their longer ends extending toward each other, oppositely faced tools carried by said tool holders, lugs to support each tool holder, and means whereby the depth of the cut of each tool may be regulated.

3. A tool holder for planers and shapers comprising a shank, a pair of tool holders pivotally mounted thereon, tools carried by said tool holders between both pivot points, and means to prevent the tool holders from twisting laterally.

4. A tool holder for planers and shapers comprising a shank, a pair of tool holders pivotally mounted thereon with their longer ends extending from the pivot points toward each other, a cutting tool carried by each tool holder between the two pivot points, a plate on the shank to prevent the tool holder from twisting laterally, and means of adjusting the depth of the cut of each cutter.

5. A tool holder for planers and shapers, comprising a shank, a pair of tool holders pivotally mounted thereon and each extending toward the pivotal point of the other, tools carried by the tool holders between both pivot points, a spring to cause the tool holders to stand normally moved away from each other and means to adjust the position of one of the tool holders.

In testimony whereof I have hereunto set my hand this January A. D. 1921.

OSCAR J. SARLANDT.